Figure 1:
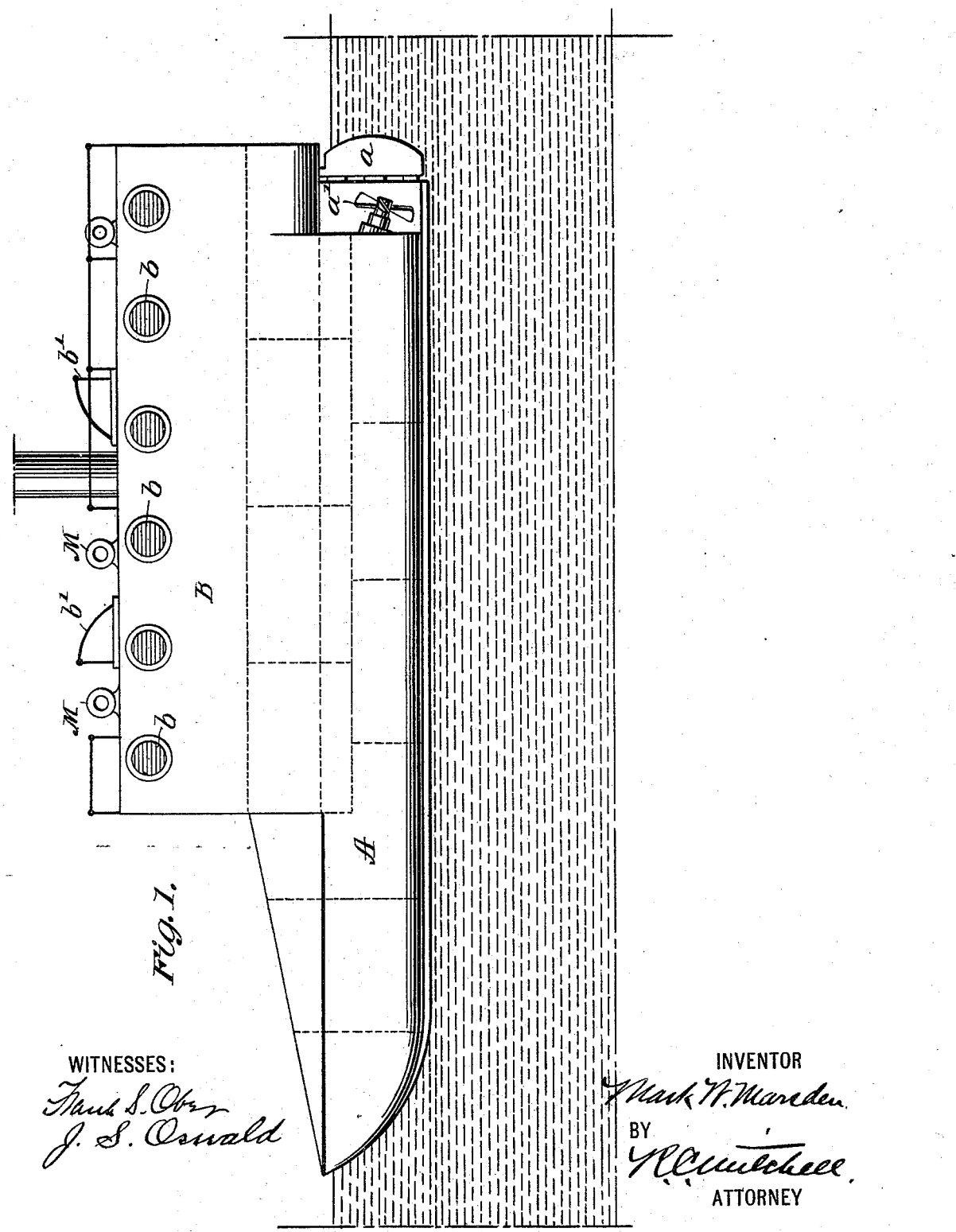

(No Model.) 8 Sheets—Sheet 2.

M. W. MARSDEN.
FLOATING DRY DOCK AND SHIP CLEANING DEVICE.

No. 570,489. Patented Nov. 3, 1896.

(No Model.) 8 Sheets—Sheet 5.

M. W. MARSDEN.
FLOATING DRY DOCK AND SHIP CLEANING DEVICE.

No. 570,489. Patented Nov. 3, 1896.

WITNESSES:

INVENTOR

BY

ATTORNEY (No Model.) 8 Sheets—Sheet 6.

M. W. MARSDEN.
FLOATING DRY DOCK AND SHIP CLEANING DEVICE.

No. 570,489. Patented Nov. 3, 1896.

WITNESSES:
Frank S. Ober
J. S. Oswald

INVENTOR
Mark W. Marsden
BY
R. C. Mitchell
ATTORNEY (No Model.) 8 Sheets—Sheet 7.
M. W. MARSDEN.
FLOATING DRY DOCK AND SHIP CLEANING DEVICE.
No. 570,489. Patented Nov. 3, 1896.

WITNESSES:

INVENTOR

ATTORNEY (No Model.)

M. W. MARSDEN.
FLOATING DRY DOCK AND SHIP CLEANING DEVICE.

No. 570,489. Patented Nov. 3, 1896.

8 Sheets—Sheet 8.

WITNESSES:
Frank S. Ober
J. S. Oswald

INVENTOR
Mark W. Marsden
BY
R. C. Mitchell
ATTORNEY.

United States Patent Office.

MARK W. MARSDEN, OF PHILADELPHIA, PENNSYLVANIA.

FLOATING DRY-DOCK AND SHIP-CLEANING DEVICE.

SPECIFICATION forming part of Letters Patent No. 570,489, dated November 3, 1896.

Application filed December 6, 1895. Serial No. 571,322. (No model.)

*To all whom it may concern:*

Be it known that I, MARK W. MARSDEN, a citizen of the United States, residing at Philadelphia, in the county of Philadelphia and State of Pennsylvania, have invented a new and useful Floating Dry-Dock and Vessel-Cleaner, of which the following is a full, clear, and exact specification.

My invention relates to a new and useful dry-dock and vessel-cleaning apparatus; and it consists in the mechanical construction of the same hereinafter fully set forth and described.

The object of my invention is to provide a floating dry-dock and vessel-cleaning apparatus which may be transferred from place to place either by its own power or outside assistance, and which can, in addition to performing the function of a cleaning apparatus for removing barnacles and other foreign substances that have accumulated upon the hulls of other vessels, also perform the function of a dry-dock to permit access to be had to the under side of vessels for the purpose of repairing, painting, or otherwise operating below the water-line without the necessity of removing said vessels from the water.

The frequent necessity of scraping, cleaning, and painting the hulls of vessels is well known on account of the constant accumulation of barnacles and other substances which decrease the speed of the vessel, increase the consumption of fuel, injure the plates by corrosion, prevent accurate steering or handling of the vessel, and which in many ways act as a detriment thereto.

The enormous expense and unavoidable danger of straining or fatally injuring a vessel by the method of dry-docking now common (which consists in floating a vessel into a basin, which is subsequently drained, so that the vessel will be supported mainly upon keel-blocks) makes it desirable that a means be provided which will reduce the expense or lessen the danger attending the present method of dry-docking. To accomplish this end I have designed a floating dry-dock and vessel-cleaning apparatus which will not only require less expense to operate, but by which there may be a very great saving of time and labor, partially attributable to the automatic machinery with which it is provided, but more directly attributable to the novel construction and application of the dry-dock proper.

My invention is illustrated by the accompanying drawings, in which—

Figure 2:
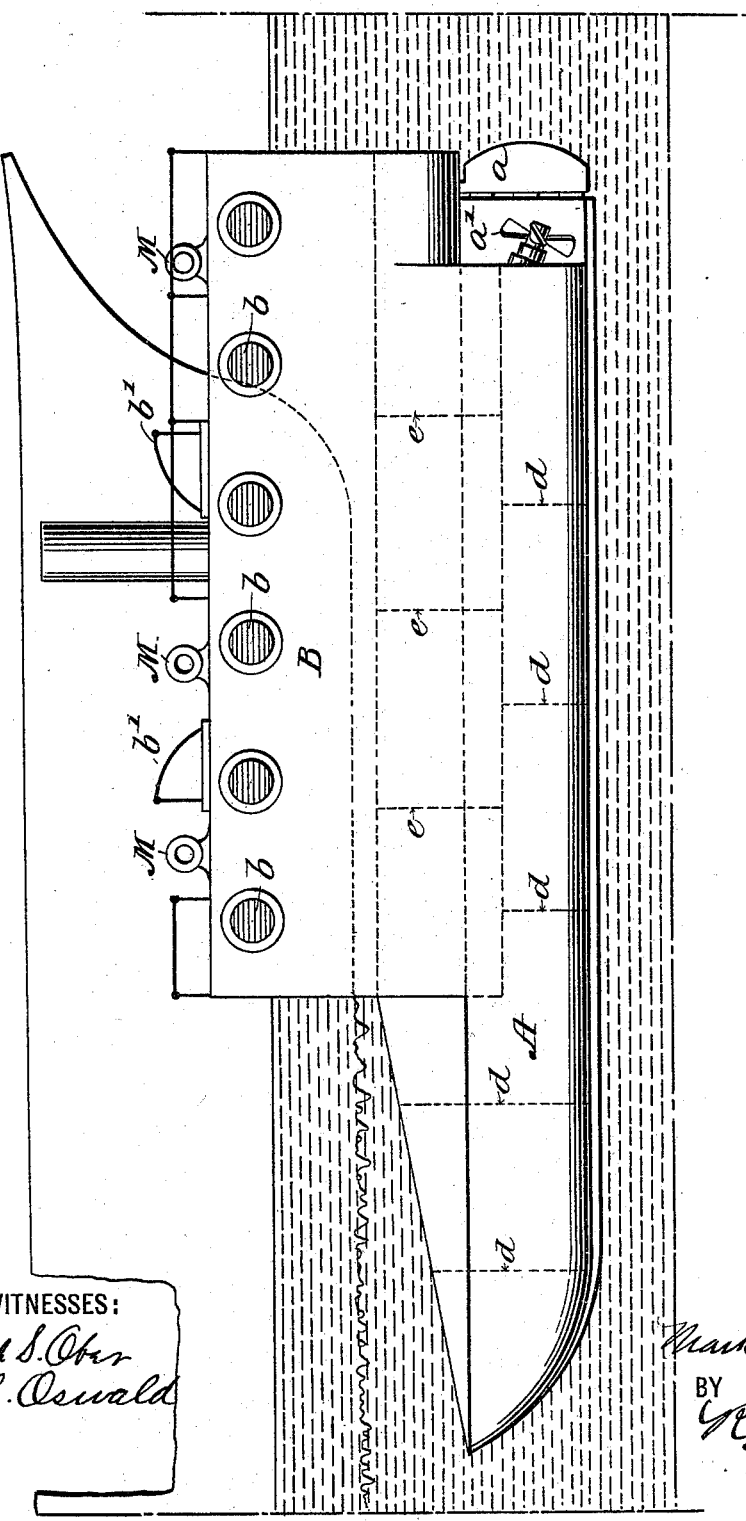
Figure 3:
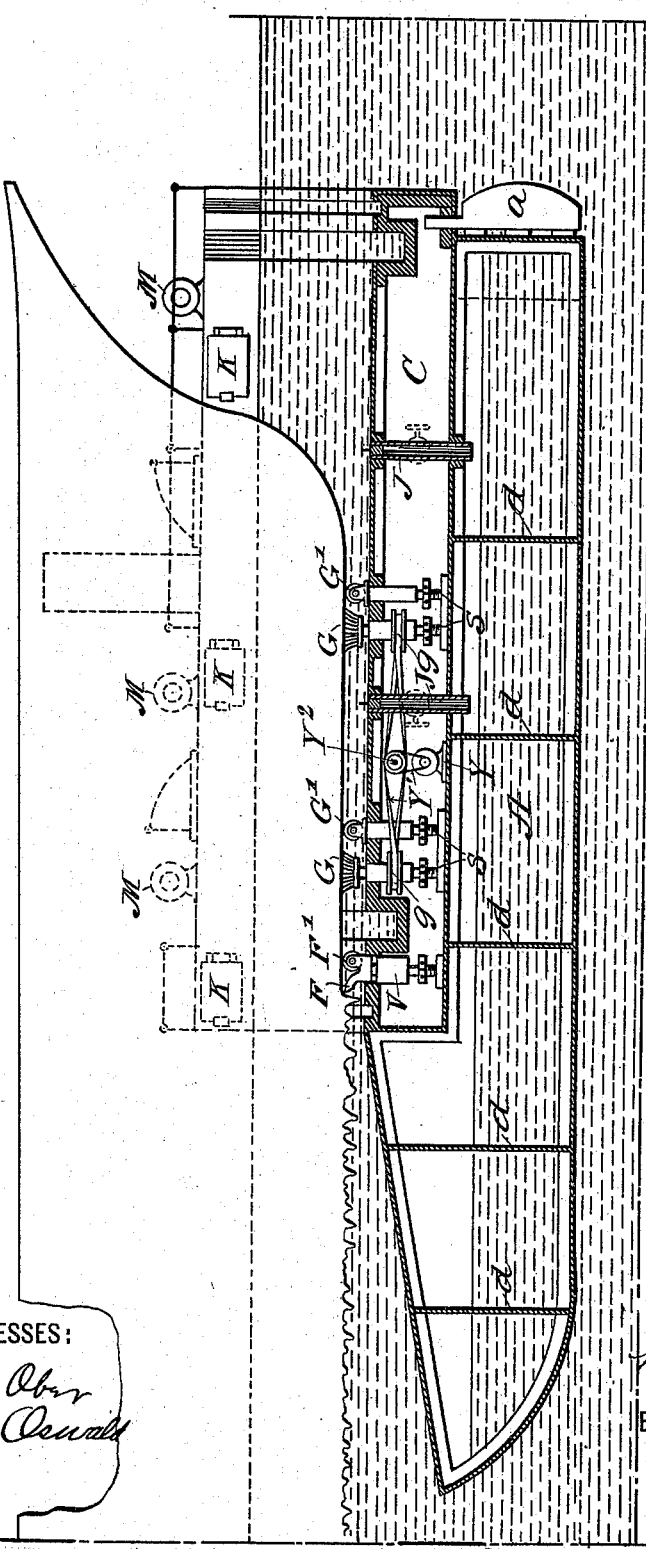
Figure 4:
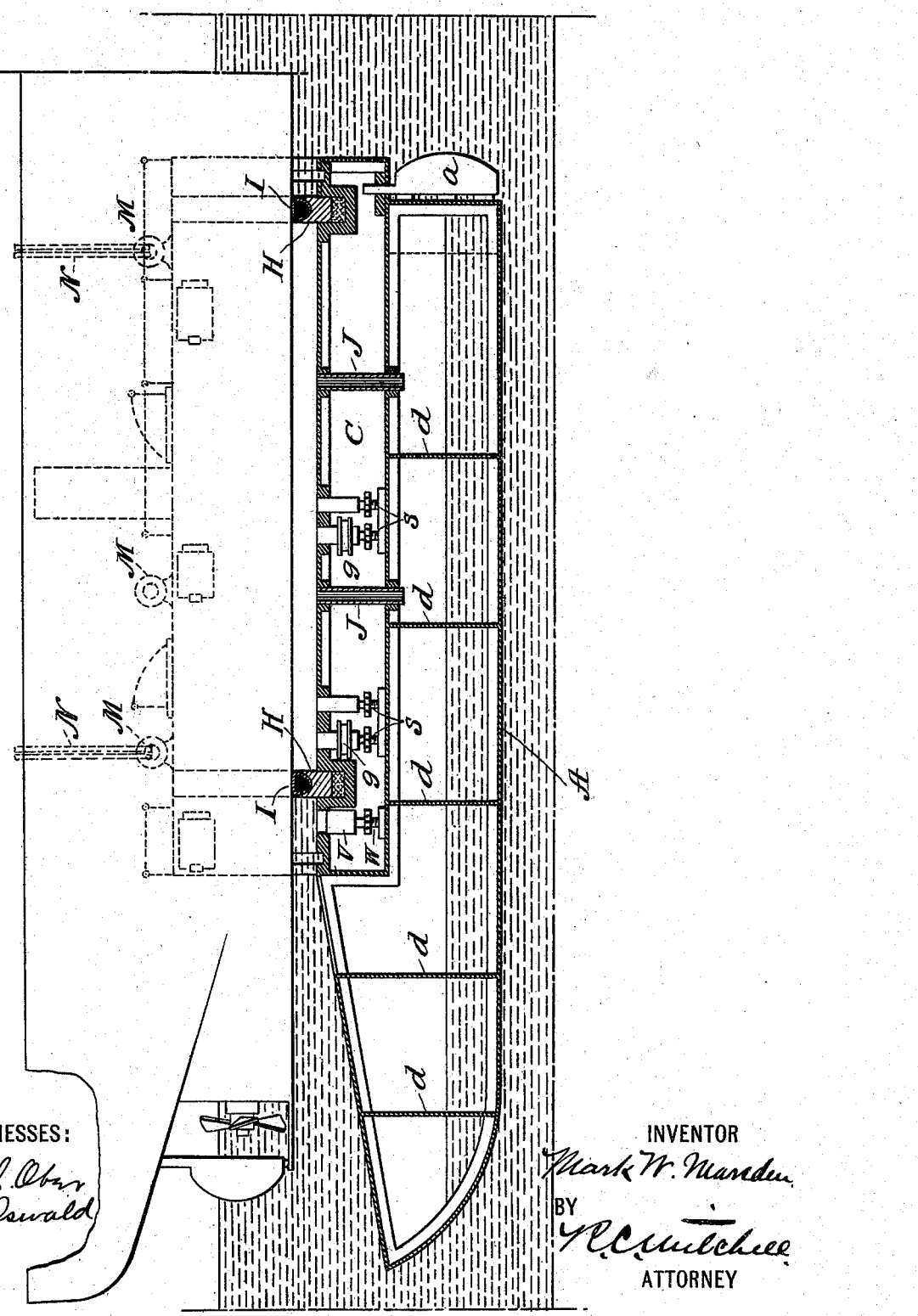
Figure 5:
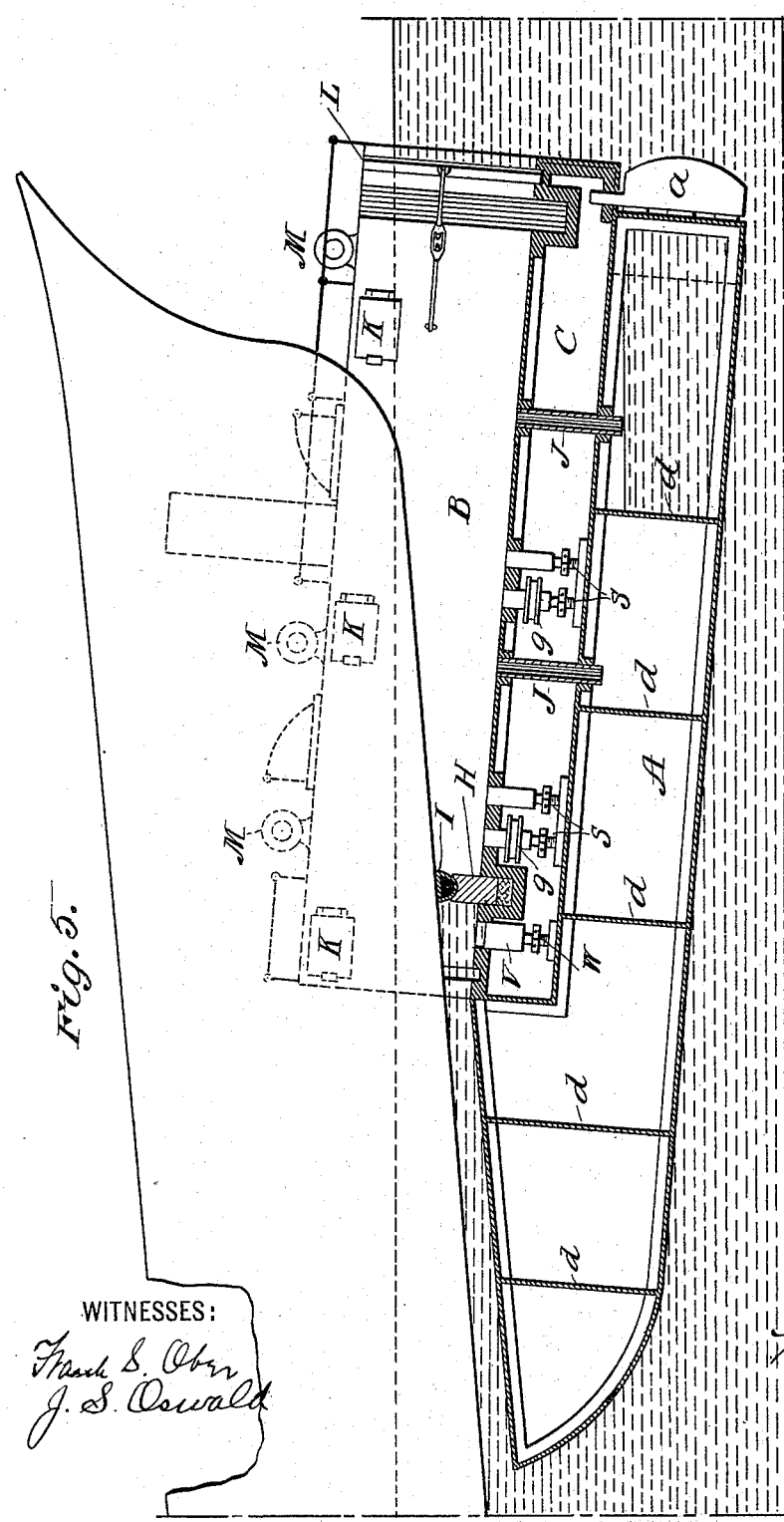
Figure 6:
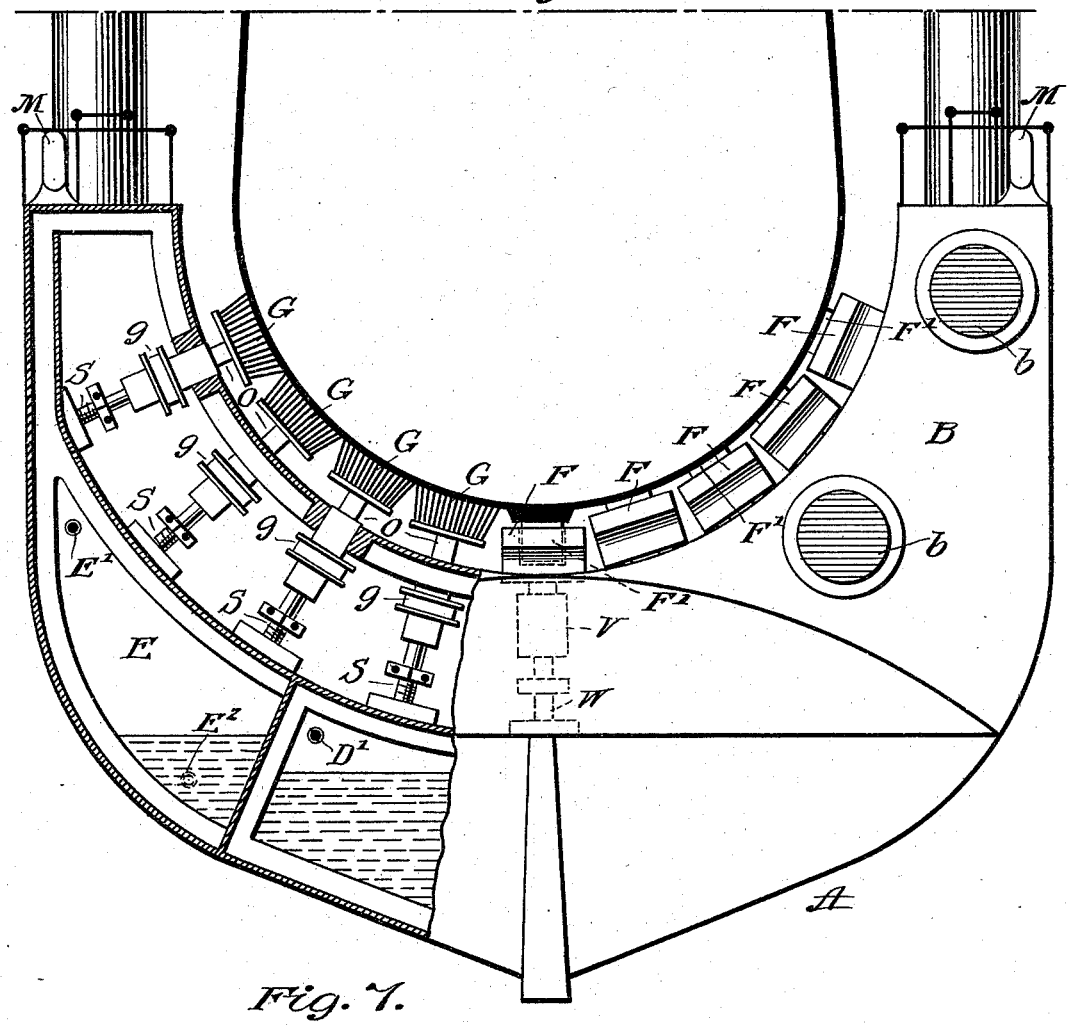
Figure 7:
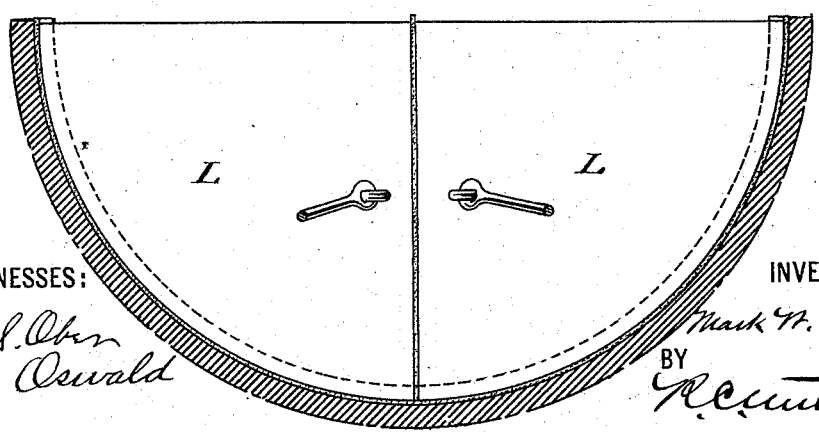
Figure 8:
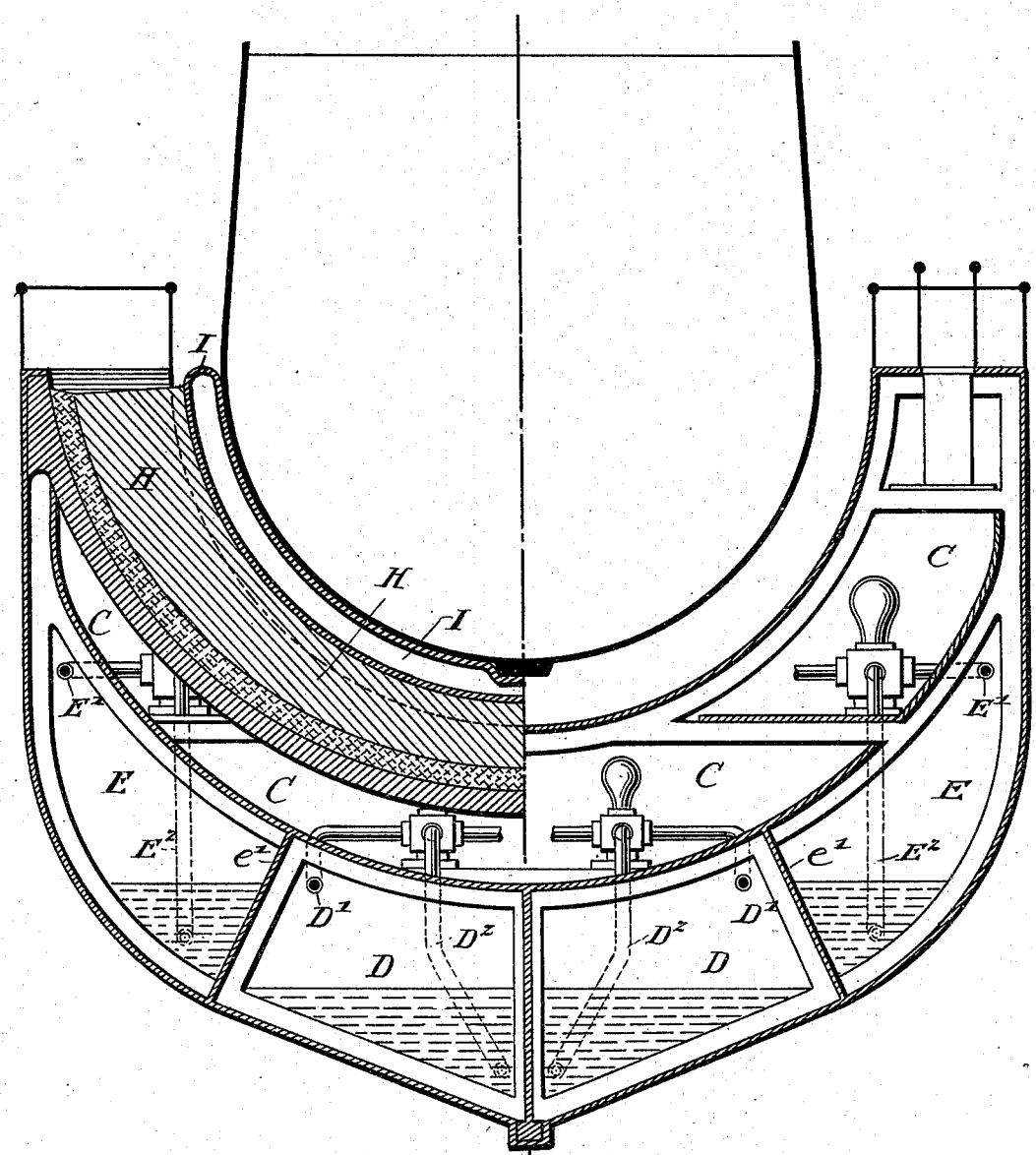
Figure 9:
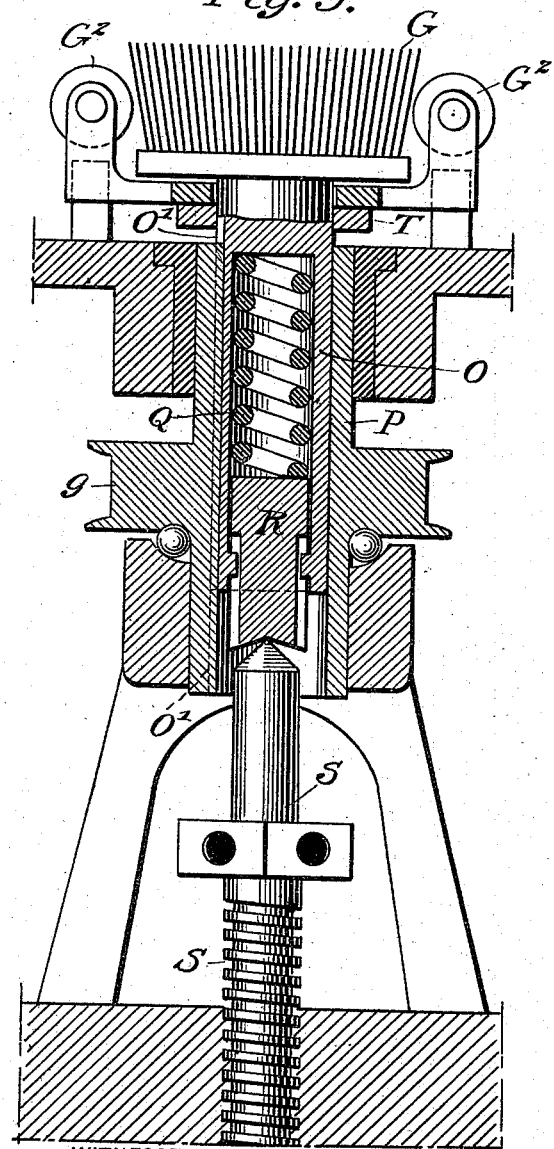
Figure 10:
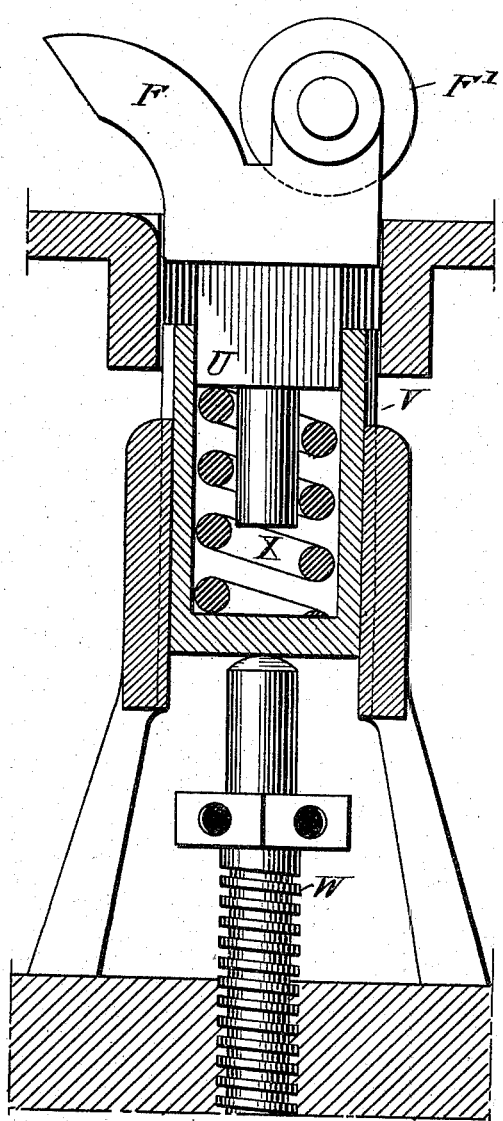

Figure 1 is a side elevation of my floating dry-dock and cleaner, showing the normal floating position. Fig. 2 is a side elevation of my floating dry-dock and cleaner, the same being partially submerged and in position to operate upon other floating vessels. Fig. 3 is a central longitudinal section of the floating dry-dock shown in Fig. 2, showing the cleaning mechanism in the operative position. Fig. 4 is a similar view illustrating my invention as applied to a vessel and performing the function of a dry-dock. Fig. 5 is a similar view of my invention in another position. Fig. 6 is an end elevation of my invention, looking toward its bow, the said figure being partly in section to reveal the internal construction. Fig. 7 is a detail view. Fig. 8 is a transverse sectional view taken on two different planes and revealing the internal construction and arrangement of the hull of my invention. Fig. 9 is a vertical sectional view showing the mechanical construction of one of the details of my invention, and Fig. 10 is a similar view showing the construction of another detail.

Similar letters refer to similar parts in all the figures.

A represents the hull of my invention.

$a$ is a rudder.

$a'$ is a screw, one or more of which may be provided, and by which the vessel may be propelled.

B B are casings extending longitudinally along each side of the hull A, so as to form a substantially U-shaped space between the same, (see Fig. 6,) into or through which space the vessel to be operated upon may project or may be passed, as hereinafter described. These casings B have by preference sufficient space within the same to contain suitable machinery for operating the various parts of the dry-dock and cleaner and at the same time afford plenty of room for the operators to work.

$b\ b$ are windows or ventilators, any number of which may be placed at desirable points in the outer sides or ends of said casings.

The roofs of the casings B B may be utilized as decks, which may be provided with suitable rails and companion-ways $b'$. When the hull of the vessel is partially submerged, as shown in Fig. 2, for the purpose of getting under the hull of another vessel, the upper portions of the said side casings B are the only portions of the dry-dock and cleaner which are out of water. It is therefore desirable that suitable ventilators and companion-ways be located toward or at the upper ends of the said casings B B, so that they may be utilized under all circumstances.

C is the space between decks, Fig. 8, in which the machinery is carried, and in which the persons who operate the dry-dock and cleaner may freely move. Supplemental floors or galleries may be provided, as desired, within the same. This space C communicates with the space in the casings B B by preference.

D D are water-compartments in the lower part of the hull. These compartments D D extend along the central lower portion of the hull, and are by preference cut up into sections by means of transverse water-tight bulkheads $d\ d$. (See Fig. 4.)

E E are water-compartments in the sides of the hull, and separated from the water-compartments D by suitable water-tight bulkheads $e'$. The compartments E E are also divided into sections by means of transverse water-tight bulkheads $e\ e$, (see Fig. 2,) substantially similar to the bulkheads $d\ d$.

By flooding the compartments D the hull of the dry-dock and vessel-cleaner will sink in the water to a level approximately corresponding to the floor of the U-shaped space between the casings B B.

$D'\ D^2$ represent suitable supply and drain pipes, respectively, for flooding or draining the compartments D D.

By flooding the compartments E E the vessel will sink until all but the upper portions of the casings B B are submerged.

$E'\ E^2$ represent suitable supply and drain pipes, respectively, for flooding or draining the compartments E E.

In operation it is only necessary to fill said compartments D D E E to a degree sufficient to sink the dry-dock and cleaner to a depth where it can be moved under the hull of the vessel to be operated upon, as shown in Fig. 2, in which figure the bow of the vessel to be cleaned is illustrated as at a point intermediate in the length of the space between the casings B B, that portion of the said vessel which is within the dry-dock having been cleaned by the mechanism I now propose to describe, the remaining uncleaned portion of the hull below the water-line being illustrated as covered with barnacles and other foreign substances. To accomplish the act of cleaning, I provide scrapers or knives F, located at suitable points around the inner surface of the U-shaped space between the casings B B. (See Figs. 3 and 6.) To the rear of each knife, and mounted by preference on the same base which supports the knife, is a roller $F'$, the upper surface of said roller extending by preference into a plane above the plane determined by the edge of the blade F. In the rear of said blades and at suitable points between the casings B are suitable brushes G, the bristles of which are by preference formed of steel or some other suitable metal, said brushes being adapted to be rotated by suitable machinery located within the working space within the hull previously referred to. The driving mechanism may be connected to the pulleys $g\ g$ or equivalent mechanism, through which medium the power may be transferred to the said brushes G. As illustrated in detail in Fig. 9, the brushes G are by preference provided with suitable means for automatically causing the same to advance or retract and means whereby the same may be adjusted so as to be raised or lowered, as hereinafter described in detail. A means also may be provided to regulate the position of the knives F, as illustrated in detail in Fig. 10, and as hereinafter fully described.

In operation the hull of the vessel to be cleaned is introduced into the U-shaped space between the casings B B, as illustrated in Fig. 2, the dry-dock and cleaner having first been sunk to a proper position to permit it to be moved under the hull of the vessel. As the dry-dock and cleaner passes under the said vessel the edges of the scrapers or knives F F cut and break up the barnacles or other hard substances which have formed upon the hull of the vessel operated upon, (see Fig. 3,) the rollers $F'$ to the rear of said knives preventing the hull of the vessel from resting directly upon the edges of the knives or scrapers, which would endanger the safety of the vessel by reason of the fact that the knives might cut and injure the bolts, rivet connections, or plates of the same should direct connection be had. That portion of the vessel which passes the knives F and rollers $F'$ is subsequently reached by the brushes G G, which contact with the hull, scouring and taking off the loosened pieces of barnacles and other substances and thoroughly cleaning the vessel. As the dry-dock and cleaner is passed under the vessel the knives F and brushes G are advanced or retracted either by manual or automatic means to compensate for the varying curves in the hull of the said vessel being operated upon.

If desirable, each brush G may be provided with separate rollers $G'$ (see Fig. 3) for the purpose of taking the weight off the brush. It is obvious, however, that the said roller $G'$ should be located by preference in a plane below the plane determined by the face of the brush, so that the said brush may freely contact with the hull.

Suitable adjusting means may be provided to raise or lower the said rollers $G'$, so that the pressure of the brushes against the hull of the vessel may be varied as desired.

If desirable, one or more rollers $G^2$ (see detail view, Fig. 9) may be substituted in place of the separate rollers G', said rollers $G^2$ being adapted to be moved automatically with said brush mechanism, as hereinafter fully described.

After a vessel has been thoroughly cleaned and it is desired to paint the same below the water-line, or in case it is desired to repair the hull, the dry-dock is sunk to the proper level and is moved under that part of the hull of the vessel where it is desired to operate. (See Figs. 4 and 5.) Previous to sinking the dry-dock, however, the shape of the vessel should be approximately ascertained and suitable form-sections H H inserted into suitable slots or retaining-spaces around the inner face of the U-shaped space between the casings B B and toward one or both ends thereof. If desirable, a suitable yielding packing, by preference pneumatic or hydraulic tubes I I, may be placed in suitable retaining-spaces upon the upper edges of the form-sections H H for the purpose of providing a yielding packing to perfect the joint between the same and the sides of the vessel to be cleaned. After the dry-dock and cleaner is moved under the vessel to the proper position by forcing out or drawing off the water from the compartments D D E E, or some of them, the hull of the dry-dock and cleaner is raised until it causes the form-sections H H or the packing I I to press tightly against the hull of the vessel to be operated upon. By this means a water-tight joint is formed. Water contained around that portion of the vessel between the sections H H at each end of the U-shaped space between the casings may then be pumped out or may be permitted to flow through the pipes J J (see Figs. 3 and 5) into the water-compartments in the hull, from which it may be subsequently emptied.

By draining the space between the sections H H above referred to free access may be had to that portion of the hull between said points and below the water-line, thus permitting operators to repair, paint, or otherwise work upon the same.

K K are suitable manholes provided on the inner sides of the casings B B, through which the operators may pass to get into the space underneath the hull of the vessel to be cleaned.

In Fig. 5 only one set of form-sections H H is provided in the space between the casings B B, inasmuch as the vessel to be operated upon only extends partially through said space. In order that the water within the dry-dock may be drawn off, a suitable dam L is provided at the opposite end of the U-shaped space between the casings B B. (See Figs. 5 and 7.) By this means, in addition to the form-sections H and packing I at the opposite end, the water is prevented from running into the said U-shaped space as it is drawn off through the drain-pipes J J.

Suitable ring-bolts M may be provided in the deck of the dry-dock for permitting suitable stays N to be connected from the deck of the vessel operated upon and the dry-dock. (See Fig. 4.) When the dry-dock is utilized in connection with vessels that may be top-heavy, the pressure of the contact of the said dry-dock with the outside of the hull of the said vessel may be made by means of these stays N instead of by lifting the vessel, as previously indicated.

I shall now proceed to describe the detail views shown in Figs. 9 and 10, in which both automatic and manual adjusting devices are shown to cover the position of the brushes G and the knives F.

In Fig. 9, O is a stem projecting downwardly from the base of the brush G. O' is a feather-spline between the said stem and a revoluble bushing P, so that rotary motion imparted to said bushing P will be transmitted to the stem O, which passes longitudinally through said bushing. Q is a spring contained within the stem O. R is a plunger extending up into the lower end of the said stem O and bearing against the lower end of the spring Q. S is an adjusting-screw located below said plunger R and bearing against same. The stem O thus described, while free for longitudinal movement, revolves with the said rotary bushing P. The action of the spring Q causes the said brush to press against the side of the vessel, but does not prevent the same from yielding to any desired degree dependent upon the character and size of the spring Q. In addition thereto the adjusting-screw S may be raised or lowered, thus causing the normal position of the stem O to be raised or lowered to the desired degree. $G^2$ are rollers supported upon a suitable frame loosely surrounding the stem O and resting upon the collar T thereon. These rollers $G^2$, as previously described, are for the purpose of preventing the brush from being crushed by the weight of the vessel, the said rollers being also adapted to cause the stem O, which supports the brush, to recede as the diameter of the vessel increases, thus making it unnecessary for the brush to perform that function.

In Fig. 10, U is a base supporting the knife F and roller F'. This base is longitudinally movable in an adjustable casing V, supported and moved by an adjusting-screw W. X is a spring within said casing V, bearing against the lower side of the base U, so that the knife F and roller F' may automatically yield.

In Fig. 3 is illustrated one means for revolving the brushes G. In said figure, Y is an electric motor. Power from said motor is transmitted to the brushes G through the ordinary system of belts Y' and pulley $Y^2$. The character of the motor and means of connection may be varied, as desired, without departing from the spirit and scope of my invention.

Having thus described my invention, what I claim, and desire to secure by Letters Patent, is—

1. A dry-dock and vessel-cleaner, comprising a hull, water-compartments in said hull, casings along each side of hull forming a U-shaped space, transverse form-sections at one or both ends of said U-shaped space between said casings, substantially as described.

2. A dry-dock and vessel-cleaner, comprising a hull, water-compartments in said hull, means for emptying or filling said compartments, casings along each side of the hull forming a substantially U-shaped space, form-sections and packings at one or both ends of said U-shaped space between said casings, substantially as described.

3. A dry-dock and vessel-cleaner, comprising water-compartments in the hull, means for filling and emptying said water-compartments, casings along each side of the hull, form-sections supporting the yielding packings transversely located at one or both ends of the space between said casings.

4. A floating dry-dock and vessel-cleaner, comprising a hull, water-compartments in said hull, means for filling or emptying said compartments, casings along each side of the hull, form-sections and packings supported thereby, and recesses for retaining said form-sections at each end of the space between the said casings, all substantially as and for the purpose described.

5. A floating dry-dock and vessel-cleaner, comprising a hull, water-compartments in said hull, means for filling or emptying said compartments, hollow casings along each side of the hull, form-sections and hollow packing-tubes resting thereon, and means for supporting or retaining the same at each end of the space between said casings, and means for draining the space between said sections and packings and said casings, when said dry-dock is in place for operation under the hull of a vessel.

6. A floating dry-dock provided with form-sections detachably held thereby and extending transversely with respect to an imaginary line extending fore and aft through the hull, said form-sections engaging the bottom and sides of the vessel operated upon and acting as a dam to prevent the passage of water, substantially as described.

7. A dry-dock and vessel-cleaner, comprising a hull supporting casings along each side thereof, means for partially submerging said dry-dock, adjustable scrapers or knives extending into the space between said casings, substantially as and for the purpose specified.

8. A dry-dock and vessel-cleaner, comprising a hull, water-compartments in said hull, means for flooding or draining said compartments, hollow casings along each side of said hull, said casings extending upwardly and forming a U-shaped space between the same through which space the vessel to be operated upon passes or is passed, longitudinally-adjustable scrapers or knives extending into said space, and rollers adjacent to said knives to prevent the same from contacting directly with the hull of the vessel to be cleaned.

9. A dry-dock and vessel-cleaner, comprising a hull, water-compartments in said hull, means for flooding or draining said compartments, hollow casings along each side of said hull forming a substantially U-shaped space through which the vessel to be operated upon passes or is passed, longitudinally-adjustable scrapers or knives, rollers to the rear of said knives projecting into a plane above the plane determined by the edge of the knives adjacent thereto, and means for automatically regulating the position of the knives and rollers, substantially as described.

10. A dry-dock and vessel-cleaner, comprising a hull, water-compartments therein, means for flooding or draining said compartments, hollow casings along each side of said hull forming substantially a U-shaped space above said hull and between said casings, revoluble brushes projecting into said U-shaped space, and means for revolving said brushes, substantially as described.

11. A dry-dock and vessel-cleaner, comprising a hull, water-compartments therein, means for flooding or draining the same, hollow casings along each side of said hull forming a substantially U-shaped space above said hull and between said casings, longitudinally-adjustable brushes revolubly mounted, and projecting into said U-shaped space, rollers adjacent to said brushes, all substantially as and for the purpose specified.

12. A floating dry-dock and vessel-cleaner, comprising a hull, water-compartments therein, means for flooding or draining said compartments, hollow casings along each side of said hull forming a substantially U-shaped space above the center of said hull and between said casings, longitudinally-adjustable scrapers or knives extending into said space, longitudinally-adjustable rotary brushes projecting into said space, and means for operating the same, substantially as described.

13. In a dry-dock and vessel-cleaner, a hull having hollow casings extending along the opposite sides thereof, separate water-compartments located along the lower part of the hull, means for flooding and draining said compartments, longitudinally-adjustable scrapers or knives, and rotary brushes, extending into the space between the said casings, means for operating the same, said means being contained within the space C and the hollow casings, substantially as described.

MARK W. MARSDEN.

Witnesses:
R. C. MITCHELL,
J. S. OSWALD.